US010230656B2

(12) United States Patent
Park

(10) Patent No.: US 10,230,656 B2
(45) Date of Patent: Mar. 12, 2019

(54) METHOD AND APPARATUS FOR CONTROLLING MESSAGE OVER HETEROGENEOUS NETWORK

(71) Applicant: KOREA ELECTRONICS TECHNOLOGY INSTITUTE, Seongnam-si (KR)

(72) Inventor: Pusik Park, Yongin-si (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 219 days.

(21) Appl. No.: 15/285,379

(22) Filed: Oct. 4, 2016

(65) Prior Publication Data

US 2017/0134299 A1    May 11, 2017

(30) Foreign Application Priority Data

Nov. 6, 2015 (KR) ........................ 10-2015-0156043

(51) Int. Cl.
*H04L 29/06* (2006.01)
*H04L 29/08* (2006.01)
(Continued)

(52) U.S. Cl.
CPC .......... *H04L 47/6275* (2013.01); *H04L 47/36* (2013.01); *H04L 49/9057* (2013.01);
(Continued)

(58) Field of Classification Search
None
See application file for complete search history.

(56) References Cited

U.S. PATENT DOCUMENTS 9,225,672 B1 * 12/2015 Dropps ................ H04L 49/254
2005/0254423 A1 * 11/2005 Berghoff ................ H04L 47/10
370/230.1
2013/0329739 A1 * 12/2013 Briscoe ................ H04L 43/028
370/392

FOREIGN PATENT DOCUMENTS

KR    10-2001-0080449 A    8/2001
KR       10 0583811         5/2006
(Continued)

OTHER PUBLICATIONS

Office Action received in Korean Patent Application No. 10-2015-0156043, dated Aug. 18, 2016.

*Primary Examiner* — Jutai Kao
(74) *Attorney, Agent, or Firm* — Knobbe Martens Olson & Bear LLP

(57) ABSTRACT

Disclosed is a method for controlling a message over a heterogeneous network. The method includes receiving a first message from a first network, generating a plurality of second messages (a "plurality of fragmented messages") each header including an arbitration field by performing fragmentation on the first message, and increasing priority of at least one remaining fragmented message by controlling the arbitration field of the at least one remaining fragmented message if the transmission of a first fragmented message over a second network is successful. An apparatus for performing the method includes a reception message processing unit, a transmission message processing unit, a transmission network sensing unit, and a message transmission continuity management unit. Accordingly, a method and apparatus for controlling a message over a heterogeneous network can be simplified, message transmission latency can be prevented, and a message transmission sequence can be maintained.

8 Claims, 13 Drawing Sheets

(51) Int. Cl.
*H04L 12/805* (2013.01)
*H04L 12/861* (2013.01)
*H04L 12/865* (2013.01)
*H04L 12/939* (2013.01)

(52) U.S. Cl.
CPC ............ *H04L 69/22* (2013.01); *H04L 69/324* (2013.01); *H04L 49/552* (2013.01)

(56) References Cited

FOREIGN PATENT DOCUMENTS

KR       10 1351285     1/2014
KR   10-2015-0034559 A   4/2015

\* cited by examiner

METHOD AND APPARATUS FOR CONTROLLING MESSAGE OVER HETEROGENEOUS NETWORK

INCORPORATION BY REFERENCE TO ANY PRIORITY APPLICATIONS

This application claims priority under 35 U.S.C. § 119 to Korean Patent Application No. 10-2015-0156043 filed on Nov. 6, 2015, the disclosure of which is hereby incorporated by reference herein in its entirety.

BACKGROUND

Field

The present invention relates to a method and apparatus for controlling a message over a heterogeneous network and, more particularly, to a method and apparatus for controlling a message over a heterogeneous network, which simplify a message transmission/reception system between heterogeneous networks having messages of different formats, reduce a message transmission/reception latency time, and maintain a transmission sequence according to a point of time at which a message is generated.

Description of the Related Art

The controller area network (CAN) protocol is a network of a single bus topology form. In the CAN protocol, several nodes are connected to a single bus, and access a medium using a contention method and exchange information. The data of a CAN message delivered over a network includes signals to be transmitted. The signal means a minimum unit having a meaning on a network, such as input/output or control input of a sensor or a driver. Such a signal is transmitted using a message over a CAN network. The message means that it has been reconstructed in a form capable of being uploaded onto a CAN bus by taking into consideration the transmitter and recipient of a signal, the length and transmission cycle of a signal, and the characteristics of time, such as the closing time of a signal.

The CAN is chiefly used to deliver control information, and thus a maximum length of a message that may be transmitted is not so great. However, heterogeneous network protocols, such as Ethernet and MOST, have a greater maximum transmission length than the CAN. There is a need for the fragmentation and reassembly process of a message due to such a difference in the maximum transmission length.

In this case, there is a problem in that a gateway needs to separately manage fragmented messages. Furthermore, there is a problem in that a node that receives fragmented messages needs to separately manage received fragments because it receives a message caught in the middle. There is a problem in that a total transmission time of fragmented messages is delayed due to a message caught in the middle.

Korean Patent No. 10-0583811 relates to "THE CAN MESSAGE IDENTIFIER ALLOCATION METHOD AND THE CAN MESSAGE TRANSFER ARBITRATION METHOD FOR THE HUMANOID ROBOT". The patent discloses a method for using an extension message form of the CAN 2.0B version, defining a basic ID of 11 bits of an arbitration field as a 3-bit class portion and an 8-bit priority level, and increasing priority of a CAN message eliminated from arbitration if two or more messages are generated in order to obtain a bus when the CAN message is transmitted by decreasing the priority level so that the CAN message has high priority upon next transmission.

Korean Patent No. 10-1351285 relates to "METHOD AND APPARATUS FOR TRANSMISSION OF DATA BETWEEN CAN NETWORK AND ETHERNET NETWORK". The patent discloses a data transmission method and apparatus includes a gateway configuration initialization step of receiving a connection establishment request from an Ethernet client that attempts to perform CAN-Ethernet communication, receiving a filtering condition on a CAN network element that needs a data exchange with the Ethernet client, and performing gateway configuration initialization, a first message check step of checking whether a CAN network message has been transmitted from a CAN channel, filtering the CAN network message based on the filtering condition according to a CAN ID included in the CAN network message, and storing a first message from which the CAN network message has been filtered in a first message repository set for each CAN ID, and a the first message transmission step of, when the first message is stored in the first message repository, checking the first message, including information stored in the first message and a destination address to identify the Ethernet client in Ethernet data, and transmitting the Ethernet data to an Ethernet channel.

PRIOR ART DOCUMENT

Patent Document

Korean Patent No. 10-0583811
Korean Patent No. 10-1351285

SUMMARY

An embodiment of the present invention is directed to the provision of a method and apparatus for controlling a message over a heterogeneous network, which are capable of simplifying a buffer in which fragmented packets are to be stored and a reassembly function by continuously receiving the fragmented packets.

An embodiment of the present invention is directed to the provision of a method and apparatus for controlling a message over a heterogeneous network, which are capable of reducing a total transmission latency time attributable to a packet caught in the middle while fragmented packets are transmitted by continuously receiving the fragmented packets.

An embodiment of the present invention is directed to the provision of a method and apparatus for controlling a message over a heterogeneous network, which are capable of maintaining a message transfer sequence according to a point of time at which a message is generated by continuously receiving fragmented packets.

In some embodiments, a method for controlling a message over a heterogeneous network includes receiving a first message from a first network, generating a plurality of second messages (hereinafter referred to as a "plurality of fragmented messages") each header including an arbitration field by performing fragmentation on the first message, and increasing priority of at least one remaining fragmented message by controlling the arbitration field of the at least one remaining fragmented message if the transmission of a first fragmented message over a second network is successful.

Increasing the priority may include checking the message transmission state of the second network and transmitting the first fragmented message.

Increasing the priority may include determining transmission continuity of the plurality of fragmented messages based on importance of the first message.

In an embodiment, increasing the priority may include gradually increasing the priority by controlling the arbitration field of each of the first to n-th (the n is a natural number of 2 or higher) fragmented messages of the remaining fragmented messages if the importance of the first message is a specific reference or less.

Increasing the priority may include increasing the priority to a predetermined reference or more by controlling the arbitration field of each of the remaining fragmented messages subsequent to the (n+1)-th fragmented message of the remaining fragmented messages if the n is smaller than the number of plurality of fragmented messages.

In an embodiment, increasing the priority may include maximizing the transmission continuity of the plurality of fragmented messages by controlling the arbitration fields of the remaining fragmented messages if the importance of the first message exceeds the specific reference.

Increasing the priority may include determining how much is the priority to be increased from a continued fragmented message if another message is caught in the middle while the plurality of fragmented messages is transmitted.

In some embodiments, a message control apparatus over a heterogeneous network includes a reception message processing unit configured to receive a first message from a first network, the transmission network sensing unit configured to check the message transmission state of a second network, the transmission message processing unit configured to generate a plurality of fragmented messages by performing fragmentation on the first message and to transmit the plurality of fragmented messages to the second network, a message transmission continuity management unit configured to determine message transmission continuity of the plurality of fragmented messages by controlling priority of each of the plurality of fragmented messages based on importance of the first message, and a control unit configured to control the reception message processing unit, the transmission network sensing unit, the transmission message processing unit, and the message transmission continuity management unit.

DETAILED DESCRIPTION

Figure 1:
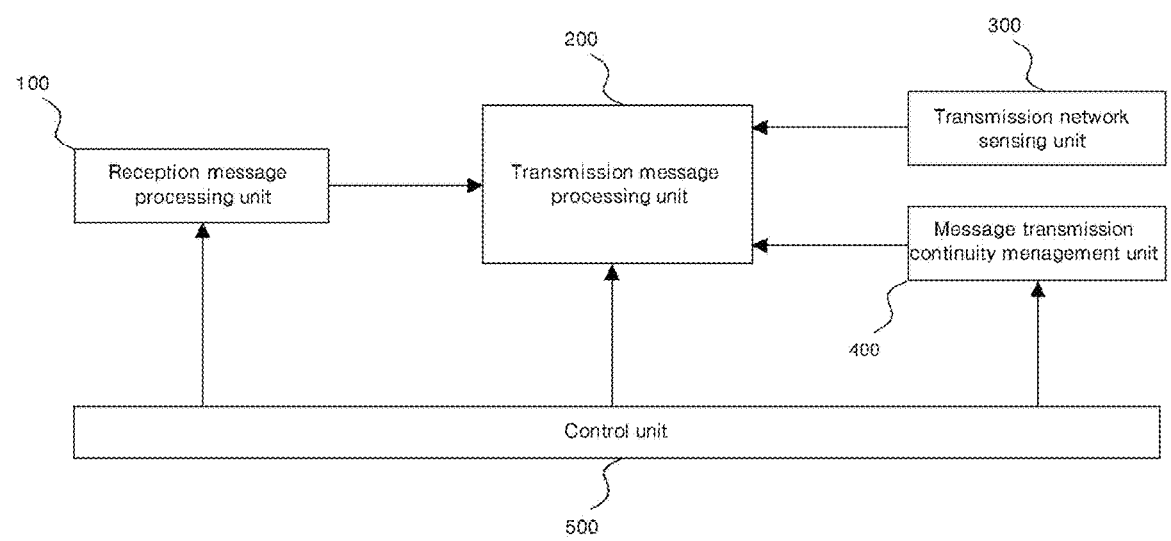
FIG. 1 is a block diagram illustrating a message control apparatus over a heterogeneous network according to an embodiment of the present invention.

The present invention may be modified in various ways and may be implemented to have several embodiments. Specific embodiments are illustrated in the drawings and are described in detail.

However, a description of the present invention is merely an embodiment for a structural and/or functional description. The scope of the present invention should not be construed as being limited to embodiments described in the context. That is, the embodiments may be modified in various forms, and the scope of the present invention should be construed as including equivalents which may realize the technical spirit.

Furthermore, an object or effect proposed in the present invention does not mean that a specific embodiment should include all of objects or effects or should include a corresponding effect, and thus the scope of the present invention should not be understood to be restricted thereby.

The meaning of terms described in this application should be construed as follows.

The terms, such as the first and the second, are used to only distinguish one element from the other element and the scope of the present invention should not be restricted by the terms. For example, a first element may be named a second element without departing from the scope of the present invention. Likewise, a second element may be named a first element.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements. Meanwhile, the same principle applies to other expressions, such as "between ~" and "just between ~" or "adjacent to ~" and "neighboring ~", which describe a relation between elements.

The singular expressions include plural expressions unless explicitly stated otherwise in the context thereof. It should be appreciated that in this application, the use of the terms "include(s)", "comprise(s)", "including" and "comprising" is intended to denote the presence of the characteristics, numbers, steps, operations, elements, or components described herein, or combinations thereof, but is not intended to exclude the probability of presence or addition of one or more other characteristics, numbers, steps, operations, elements, components, or combinations thereof.

In each of steps, symbols (e.g., a, b, and c) are used for convenience of description, and the symbols do not describe order of the steps. The steps may be performed in order different from order described in the context unless specific order is clearly described in the context. That is, the steps may be performed according to described order, may be performed substantially at the same time, or may be performed in reverse order.

In this case, unless defined otherwise, all terms used herein have the same meanings as those generally understood by persons of ordinary skill in the technical field to which the present invention pertains. The terms, such as terms that are generally used and defined in dictionaries, should be construed as having meanings identical to those that are used in the context of related technology, and should not be construed as having ideal or excessively formal meanings unless explicitly defined otherwise Hereinafter, preferred embodiments of the present invention are described in more detail with reference to the accompanying drawings. In describing the present invention, in order to help general understanding, the same reference numerals are used to denote the same elements throughout the drawings, and a redundant description of the same elements is omitted.

FIG. 1 is a block diagram illustrating a message control apparatus over a heterogeneous network according to an embodiment of the present invention.

Referring to FIG. 1, the message control apparatus over a heterogeneous network according to an embodiment of the present invention includes a reception message processing unit 100, a transmission message processing unit 200, a transmission network sensing unit 300, a message transmission continuity management unit 400, and a control unit 500.

In an embodiment, the message control apparatus over a heterogeneous network may be a gateway device for the transmission of data between heterogeneous networks. The first network of the heterogeneous networks may correspond to Ethernet or a media oriented system transport (MOST) network, and the second network thereof may correspond to a CAN network. Furthermore, the heterogeneous networks may include all of networks having different data formats, lengths, and sizes between the first network and the second network.

The reception message processing unit 100 may receive a first message from the first network and transmit the received first message to the transmission message processing unit 200. In an embodiment, the reception message processing unit 100 may receive a connection establishment request from an Ethernet client and receive the condition of a CAN network that requires a data exchange with the Ethernet client. The first message may include a variety of types of content data, that is, Ethernet network data, and may include data from air-conditioners, sheets, and audios or data, such as various environment configurations, which is MOST network data for vehicle.

The transmission message processing unit 200 may generate a plurality of fragmented messages, each having an arbitration field in its header, by fragmenting the first message of the first network received from the reception message processing unit 100. For example, if the first message is an Ethernet data message, the transmission message processing unit 200 may transmit the first fragmented message of the plurality of fragmented messages to the second network. If the transmission is successful, the message transmission continuity management unit 400 may increase transmission priority of the remaining fragmented messages by controlling the arbitration field included in each of the remaining fragmented messages. A method for increasing the transmission priority of the remaining fragmented messages by controlling the arbitration fields is described later with reference to FIG. 6.

The transmission network sensing unit 300 may collect information about the message transmission state of the second network, and may determine whether the transmission message processing unit 200 will transmit the plurality of fragmented messages to the second network. For example, if another message is already transmitted to the second network, the transmission message processing unit 200 may delay the transmission of a message to the second network. In an embodiment, if another message is caught in the middle and attempts to be transmitted while the plurality of fragmented messages is transmitted, the transmission network sensing unit 300 may transmit corresponding information to the transmission message processing unit 200 and the message transmission continuity management unit 400.

The message transmission continuity management unit 400 may determine the transmission continuity of the plurality of fragmented messages based on importance of the first message that the transmission message processing unit 300 attempts to transmit it to the second network. If another message is caught in the middle and transmitted while the plurality of fragmented messages of the first message is transmitted, the message transmission continuity management unit 400 may compare importance of the first message with importance of another message, and may determine how much has the transmission message processing unit 200 to increase priority of a continued fragmented message how much.

In an embodiment, if the importance of the first message is a specific reference or less, the message transmission continuity management unit 400 may control an arbitration field included in each of the first to n-th fragmented messages of the remaining fragmented messages so that corresponding priority is gradually increased. In this case, the specific reference may be relatively set. For example, if importance of a message from a media device is compared with importance of a message from a brake operation while a vehicle is driven, the importance of the message from the brake operation may be set high in order to prevent an accident. That is, the importance of the message from the media device becomes the reference or less based on the message from the brake operation. Accordingly, in the case of a message having importance of a specific reference or less, a plurality of fragmented messages can be continuously transmitted by gradually increasing priority of the fragmented messages, and priority may also be given to the transmission of another message having high importance if another message is transmitted while the plurality of fragmented messages is transmitted.

Furthermore, if the importance of the first message is a specific reference or less and the number of n-th fragmented messages whose priorities have been gradually increased is smaller than a total number of fragmented messages, the transmission message processing unit 200 may increase priority of each of fragmented messages subsequent to an (n+1)-th fragmented message to a predetermined reference or more by controlling the arbitration field of each of the fragmented messages. In this case, the excessive delay of the transmission of all of messages can be prevented although a message is a first message having low importance. That is, the remaining fragmented messages can be continuously transmitted by further increasing priorities of fragmented messages subsequent to the (n+1)-th fragmented message.

In another embodiment, if the importance of the first message exceeds the specific reference, the message transmission continuity management unit 400 may increase priority of each of the plurality of fragmented messages to a maximum by controlling the arbitration field of each of the remaining fragmented messages. If the importance of the first message is high, the transmission of the plurality of fragmented messages may be prevented from being interrupted by setting the priority of the first message to be higher than those of other messages. In this case, if another message having higher importance is transmitted while the plurality of fragmented messages is transmitted, the transmission of the remaining fragmented messages may be stopped and priority may be given to the transmission of another message.

Figure 2:
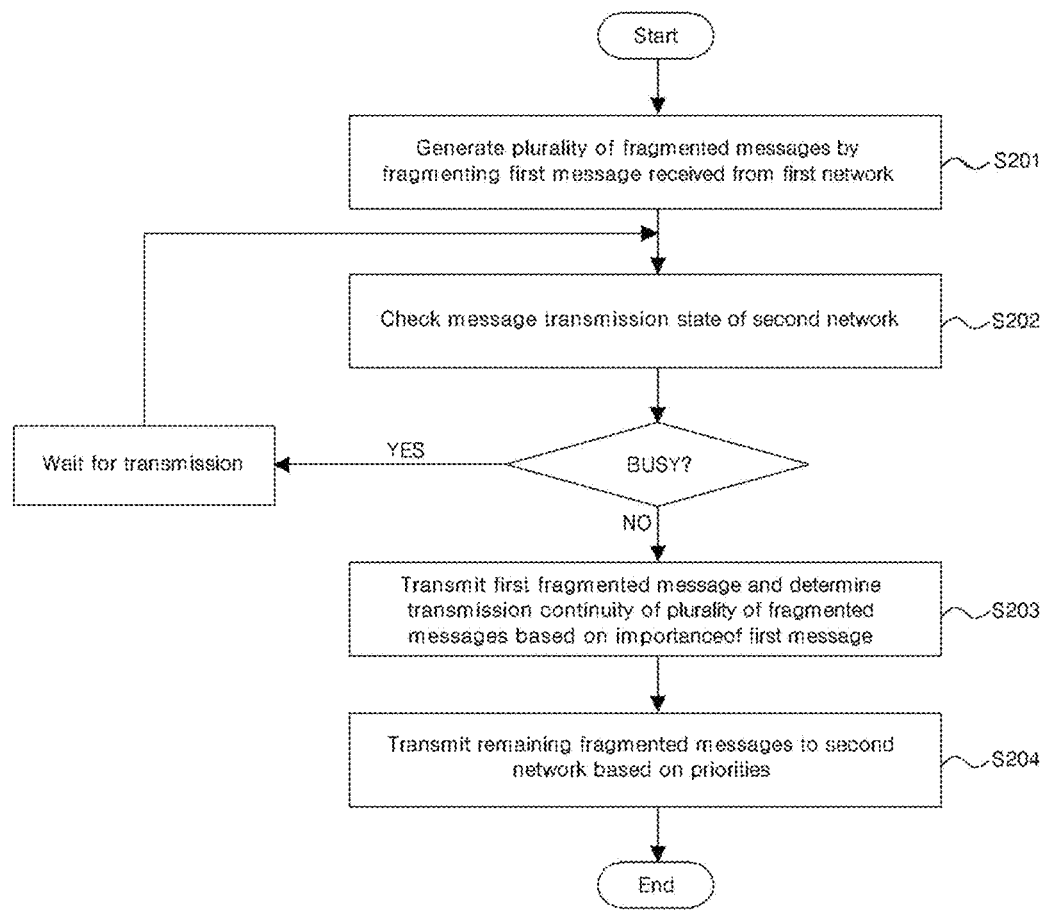
FIG. 2 is a flowchart illustrating a method for controlling a message over a heterogeneous network according to an embodiment of the present invention.

FIG. 2 is a flowchart illustrating a method for controlling a message over a heterogeneous network according to an embodiment of the present invention.

Referring to FIG. 2, the reception message processing unit 100 receives a first message from a first network. The transmission message processing unit 200 generates a plurality of fragmented messages by fragmenting the received first message (S201). The transmission network sensing unit 300 checks the message transmission state of a second network. If, as a result of the check, the second network is found to transmit a message, the transmission network sensing unit 300 suspends the transmission of messages of the transmission message processing unit 200. If, as a result of the check, the second network is found to not transmit a message, the transmission message processing unit 200 transmits a first fragmented message to the second network (S203).

Furthermore, the message transmission continuity management unit 400 determines the transmission continuity of the plurality of fragmented messages based on importance of the first message. Furthermore, if another message is caught in the middle while the plurality of fragmented messages is transmitted, the transmission network sensing unit 300 may deliver information about the message transmission state of the second network to the message transmission continuity management unit 400 and the transmission message processing unit 200 so that the degree to which priorities of the fragmented messages are increased and whether the fragmented messages will be transmitted may be determined. The transmission continuity of the plurality of fragmented messages may be determined based on a specific reference for the priorities of the fragmented messages, and may be determined by controlling the priorities of the fragmented messages through control of an arbitration field included in each of the plurality of fragmented messages depending on whether the importance of the first message is the specific reference or less or exceeds the specific reference. The transmission message processing unit 200 may transmit the remaining fragmented messages to the second network based on the increased priorities (S204).

FIG. 3 shows the structure of an Ethernet/CAN interoperability network, which is an example of a connection between a first network and a second network in FIG. 2.

Figure 3A:
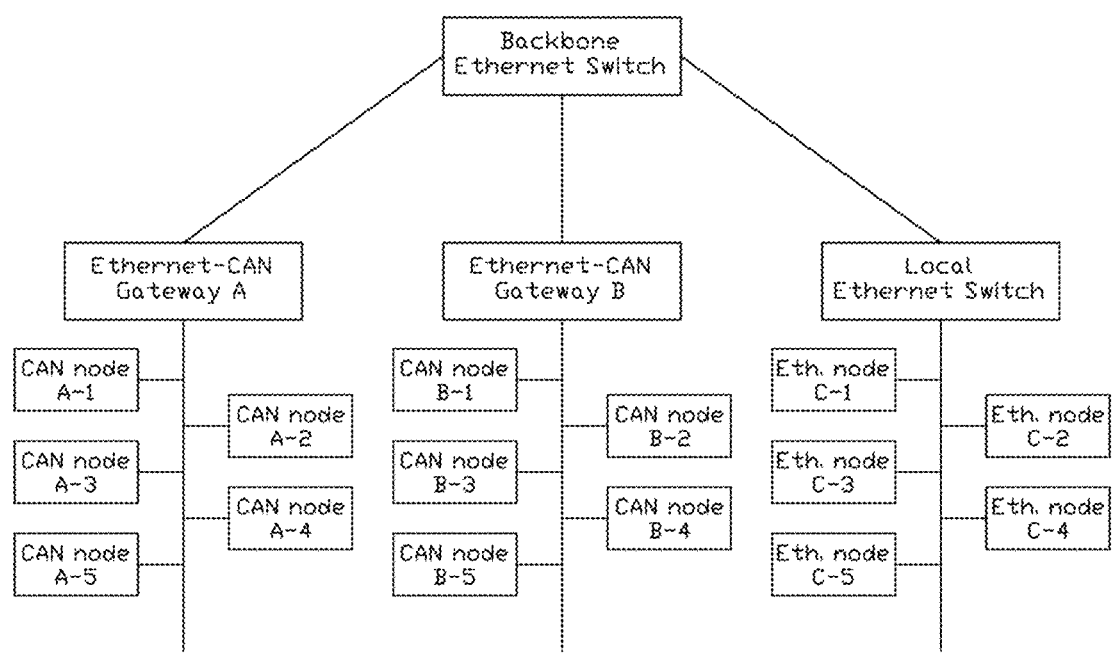
FIGS. 3a-3c show the structure of an Ethernet/CAN interoperability network, which is an example of a connection between a first network and a second network in FIG. 2.

In FIG. 3, a first network may be Ethernet or a MOST network, and a second network may be a CAN network. FIG. 3a shows the configuration of an Ethernet-to-CAN gateway. The configuration of a network within a vehicle using Ethernet as a backbone may be the same as FIG. 3a. A plurality of the Ethernet-to-CAN gateways may be present in a single bus. Ethernet may operate in conjunction with the CAN network through the gateway. The Ethernet-to-CAN gateway functions to convert and deliver an Ethernet frame and a CAN message. A gateway A exchanges data with CAN nodes A-1 to A-5, and the gateway B also performs the same function as the gateway A.

Figure 3B:
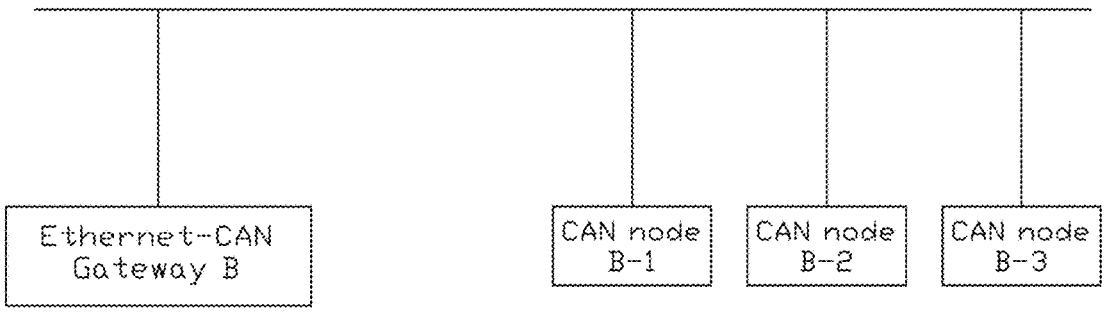

FIG. 3b shows one of the CAN local buses of a CAN bus network having a plurality of the Ethernet-to-CAN gateways and a plurality of the nodes in FIG. 3a.

Figure 3C:
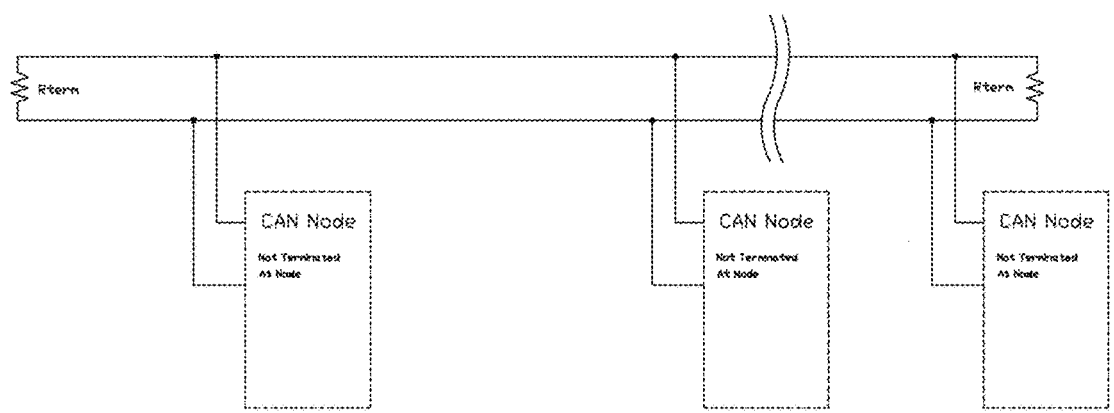

FIG. 3c shows the configuration of a CAN bus network. A CAN protocol is a network of one bus topology form. In the CAN protocol, several nodes are connected to a single bus, and they access a medium in accordance with a contention method and exchange information. A message arbitration method when a collision is generated during the exchange of data between a gateway and a CAN node or between one CAN node and the other CAN node is described below.

FIG. 4 is a conceptual diagram illustrating an existing transmission method and a basic format structure of a CAN message if redundant transmission messages are generated in a node in the CAN bus network of FIG. 3.

If redundant messages to be transmitted are present in a CAN network node, they may be transmitted through a preemptive or non-preemptive method.

Figure 4A:
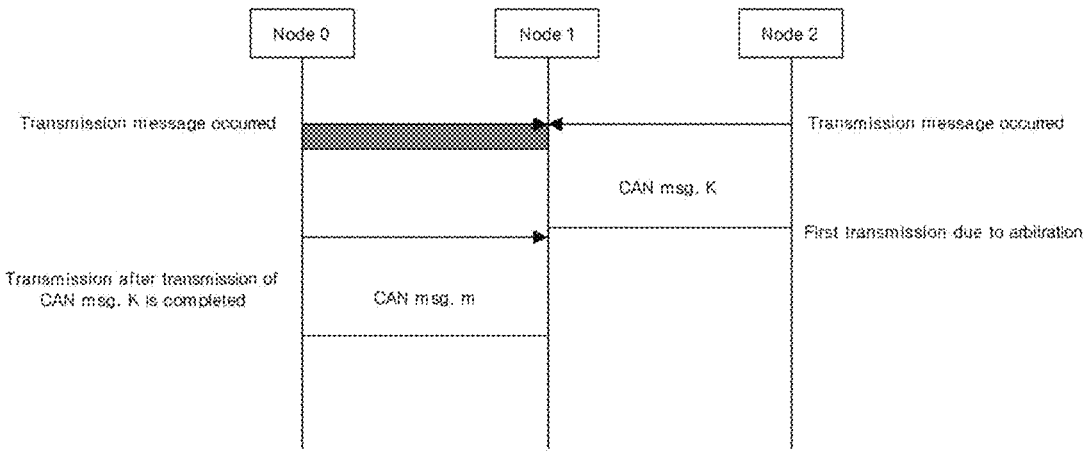
FIGS. 4a-4c show a conceptual diagram illustrating an existing transmission method and a basic format structure of a CAN message if redundant transmission messages are generated in a node in a CAN bus network of FIGS. 3a-3c.

FIG. 4a is a conceptual diagram illustrating the preemptive method. In the preemptive method, a message having an arbitration ID of higher priority is first transmitted. In general, if a plurality of nodes attempts to access a medium at the same time, a collision is generated between messages, and the transmission of a message fails. However, the CAN provides a medium access method in such a way as to first transmit a message having a dominant bit of higher priority and to then transmit a message having a recessive bit of lower priority based on a determination of whether a bit of an arbitration field is recessive(1) or dominant(0). That is, CAN arbitration ID values are differently set, and thus messages may be transmitted without a collision based on priority. In FIG. 4a, if Node 0 and Node 2 attempt to transmit messages at the same time, Node 0 attempts to transmit a CAN message m, but stops the transmission because the CAN message K of Node 2 has a higher ID value than that of Node 0. Accordingly, the CAN message K of Node 2 is first transmitted. Node 0 reattempts to transmit the CAN message m after the transmission of the CAN message K is completed.

Figure 4B:
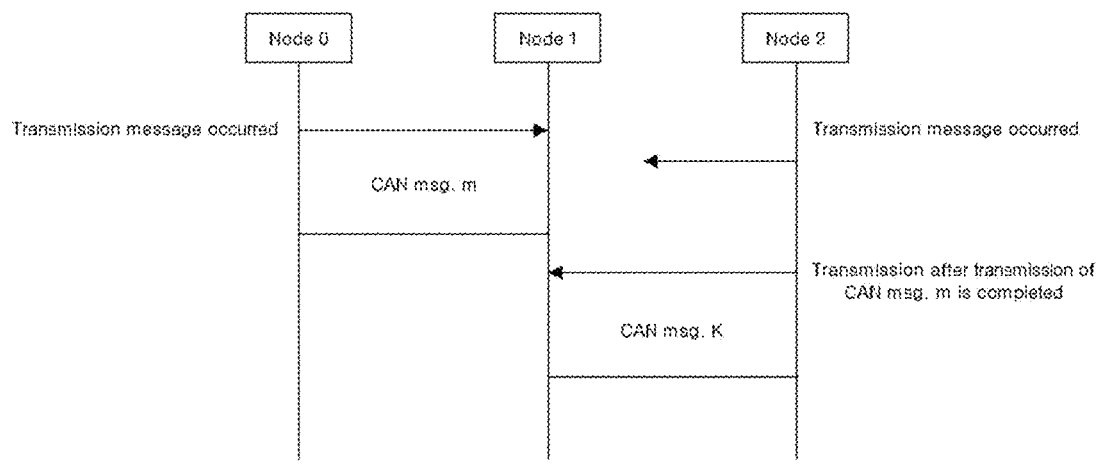

FIG. 4b is a conceptual diagram illustrating the non-preemptive method. The non-preemptive method may be said to be a method for preventing another message from being transmitted while a fragmented message is transmitted. If Node 2 attempts to transmit a message K while Node 0 transmits a message m, the message m of Node 0 started to be first transmitted regardless of priorities of the message m of Node 0 and the message K of Node 2 may be transmitted regardless of the transmission of the message K of Node 2 which has occurred during the transmission of the message m of Node 0.

Figure 4C:
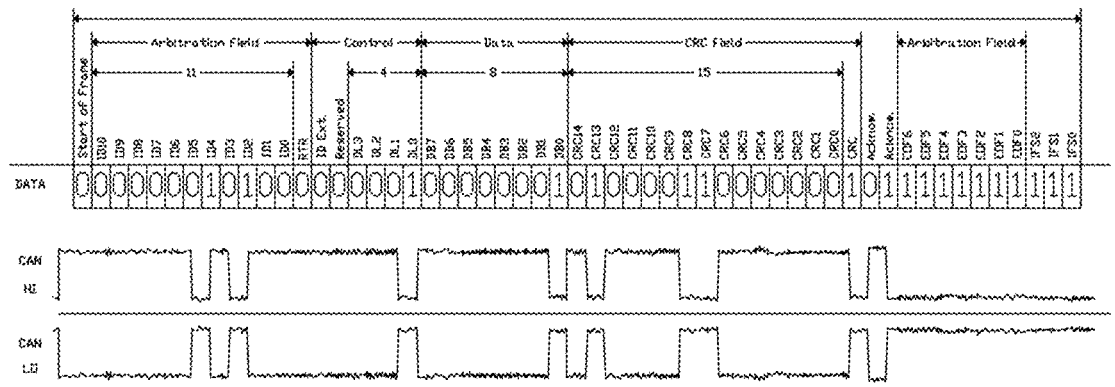

FIG. 4c shows a configuration illustrating a basic format of a CAN message.

The CAN protocol has two message formats of a standard CAN form of Version 2.0A and an extension CAN form of Version 2.0B. Version 2.0A has an ID length of 11 bits, and Version 2.0B has an ID length of 29 bits. Version 2.0B and Version 2.0B have the same length of data of 0 to 8 bytes. That is, the ID of the CAN 2.0B version includes a basic ID of 11 bits and an extension ID of 18 bits. As shown in FIG. 4c, the data configuration of the extension message of the CAN 2.0A version includes the start of frame (SOF) field of 1 bit indicative of the start of a frame, an arbitration field of 11+1 (RTR) bits, a control field of 6 bits, a data field of 8 bits, a CRC field of 15+1 bits, an acknowledge field of 2 bits for checking whether transmission is performed, and an end of frame of 7 bits indicative of the end of the frame.

FIG. 5 is a conceptual diagram illustrating a system in which a message frame is fragmented between the Ethernet and CAN network of FIG. 3 and transmitted in accordance with an existing method.

Figure 5A:
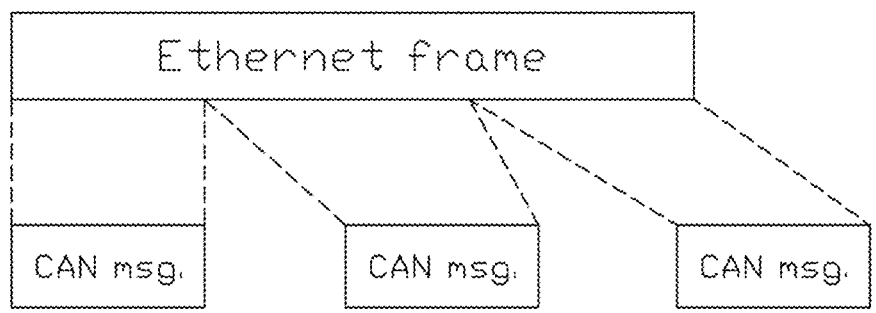
FIGS. 5a-5e show a conceptual diagram illustrating a system in which a message frame is fragmented between the Ethernet and CAN network of FIGS. 3a-3c and transmitted in accordance with an existing method.
Figure 5B:
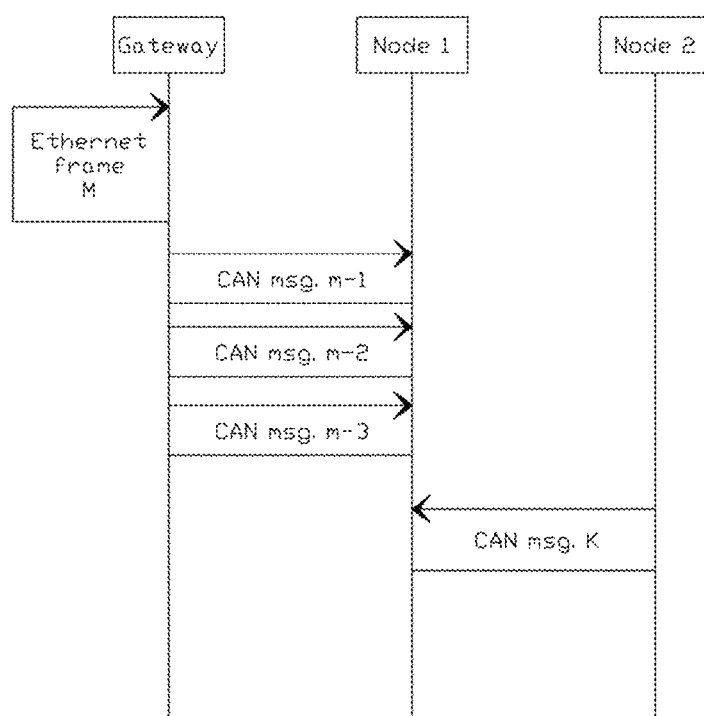
Figure 5C:
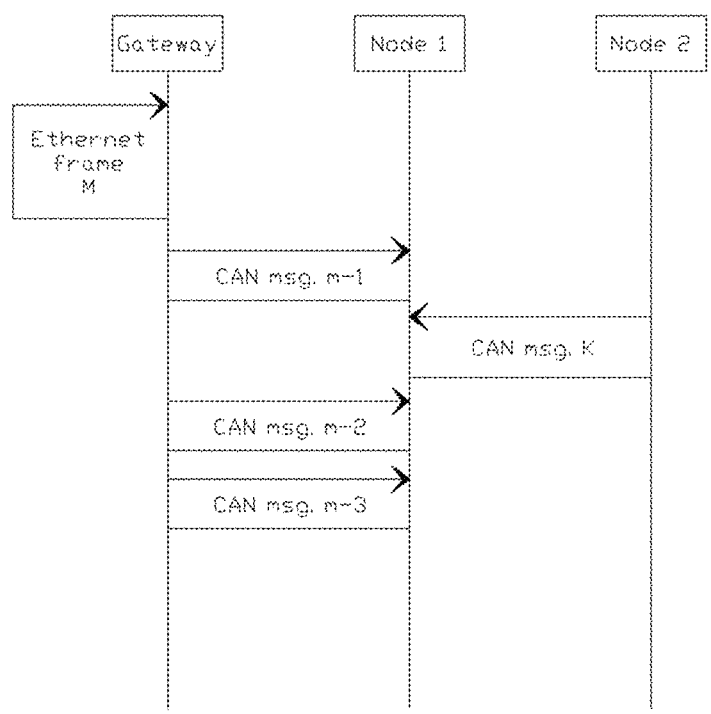
Figure 5D:
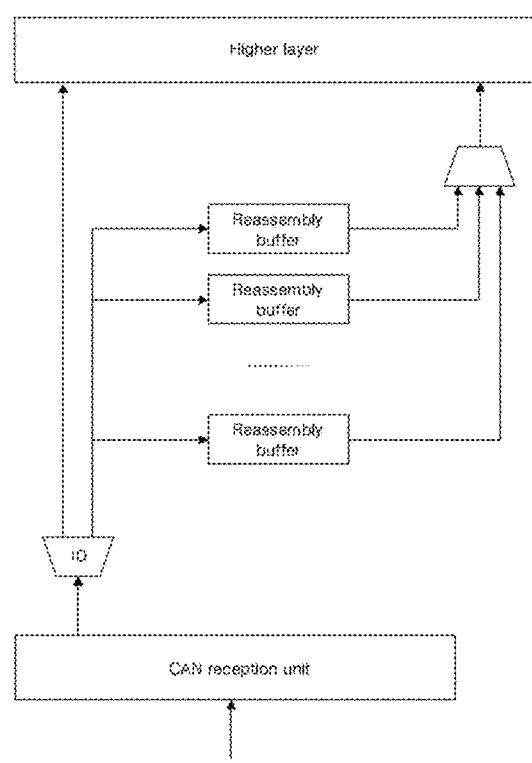
Figure 5E:
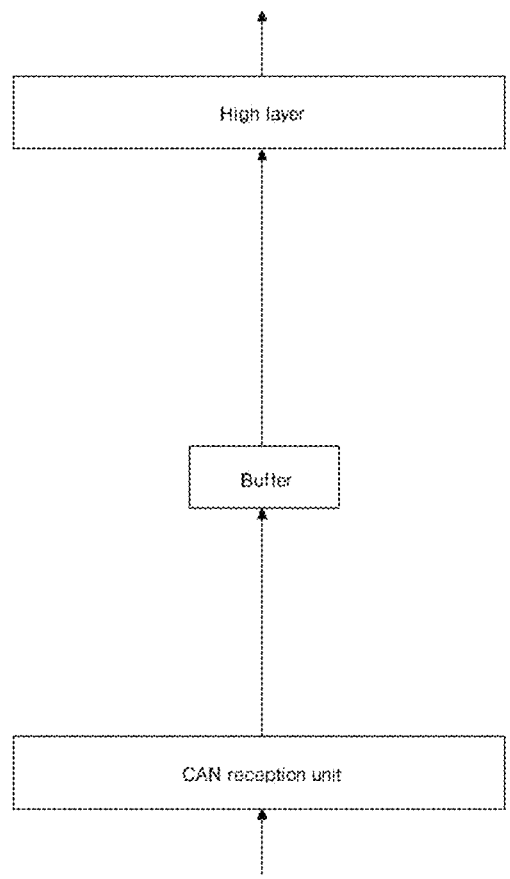

As shown in FIG. 5a, an Ethernet message frame needs to be fragmented because the Ethernet message frame and a CAN message frame have different sizes. Referring to FIG. 5b, a gateway fragments an Ethernet frame M into 3 CAN messages m-1, m-2, and m-3 and transmits them to Node 1. If the CAN message K of Node 2 is generated after the transmission of the CAN messages m-1, m-2, and m-3 was completed, the transmission of the fragmented messages of the CAN message K is not stopped. However, while fragmented messages are transmitted to a CAN network, other nodes of the CAN network may attempt to transmit messages at the same time. If the CAN message K of Node 2 having higher priority is caught in the middle while fragmented messages m-1, m-2, and m-3 are transmitted as shown in FIG. 5c, Node 1 does not complete the reception of the remaining fragmented messages m-2 and m-3 and has to receive the CAN message K. Accordingly, there is a need for a separate memory space for separately managing and assembling fragmented messages as shown in FIG. 5d. If fragmented messages can continue to be received without stopping the transmission of fragmented messages although another message is caught in the middle while the fragmented messages are transmitted, however, a simple system configuration is possible as shown in FIG. 5e.

FIG. 6 shows a method for controlling a message over a heterogeneous network according to an embodiment of the present invention and is a conceptual diagram illustrating that priority is increased by controlling the arbitration fields of fragmented messages and the fragmented messages are continuously transmitted.

Figure 6A:
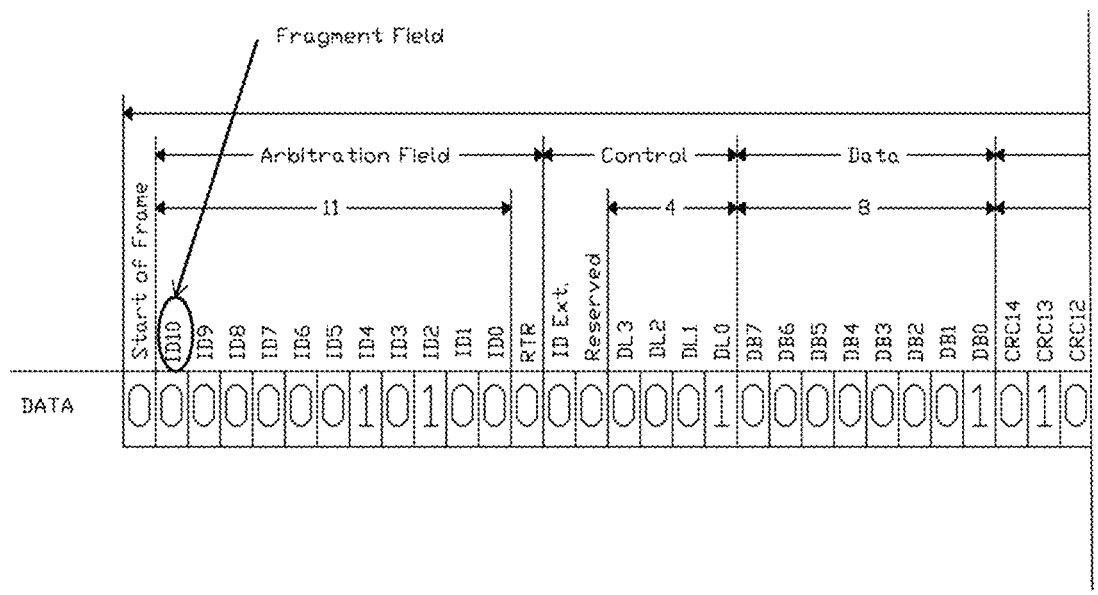
FIGS. 6a-6c show a method for controlling a message over a heterogeneous network according to an embodiment of the present invention and is a conceptual diagram illustrating that priority is increased by controlling the arbitration fields of fragmented messages and the fragmented messages are continuously transmitted.

FIG. 6a is a method for controlling the arbitration fields of fragmented messages and shows the configuration of a CAN message format in which the first bit of a CAN message arbitration field is used as a fragment field.

The message transmission continuity management unit 400 may change priorities of a plurality of fragmented messages through a fragment field. For example, at normal times, the fragment field of the plurality of fragmented messages is a recessive bit (recessive(1)). The message transmission continuity management unit 400 may change priorities of the plurality of fragmented messages by changing the fragment field into a dominant bit (dominant(0)) from the second fragmented message. Accordingly, the plurality of fragmented messages can be continuously transmitted although another message having a fragment field of a recessive bit (recessive(1)) is caught in the middle.

In an embodiment, the message transmission continuity management unit 400 may use the first bit that belongs to an arbitration field and that is first transmitted as a More flag so as to maximize transmission continuity. The message transmission continuity management unit 400 may distinguish and manage the message IDs of nodes by changing the IDs through More flags. However, the actual size of an ID may be reduced due to the More flag. For example, a More flag may be 1 bit and the length of an ID may be 10 bits.

The CAN message format of FIG. 6a is a standard CAN message format defined in ISO 11898-1:2003. The CAN message format may be ARINC 825-2 (General Standardization of the Controller Area Network (CAN) Bus Protocol for Airborne Use) in addition to ISO 11898-1:2003.

Figure 6B:
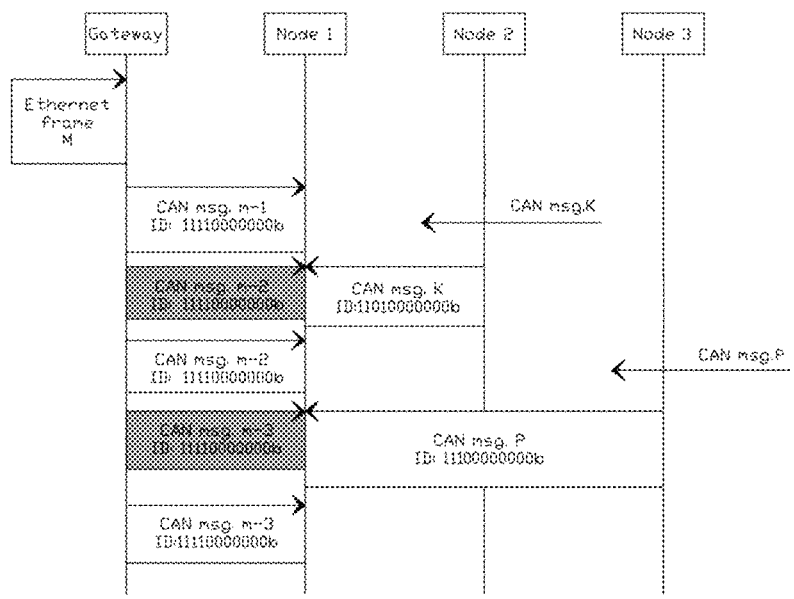

FIG. 6b is a conceptual diagram showing that fragmented messages are transmitted in accordance with an existing method not using a fragment field.

If a CAN message m-2, that is, a fragmented message, and a CAN message K have been transmitted at the same time and are in a contention state, the CAN message m-2 cannot be transmitted until the transmission of the CAN message K having higher priority is completed. Furthermore, the transmission of a CAN message m-3 is delayed until the transmission of a CAN message P having higher priority is completed.

Figure 6C:
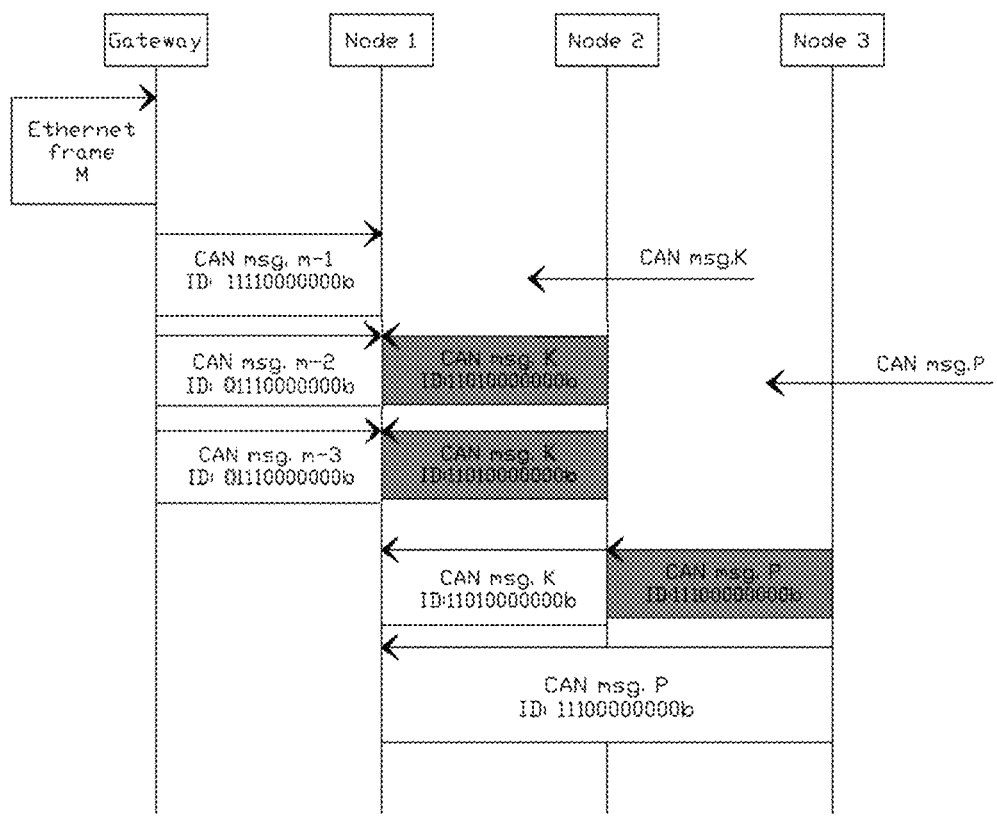

FIG. 6c is a conceptual diagram showing that fragmented messages are continuously transmitted using fragment fields.

The message transmission continuity management unit 400 may change the fragment fields (i.e., the first bits of arbitration fields) of a CAN message m-2, that is, a second fragmented message, and a CAN message m-3, that is, a third fragmented message, into dominant bits (dominant) so that the CAN message m-2 and the CAN message m-3 have higher priorities than the CAN message K and the CAN message P, respectively. Accordingly, a plurality of the fragmented messages can be continuously transmitted.

Figure 7:
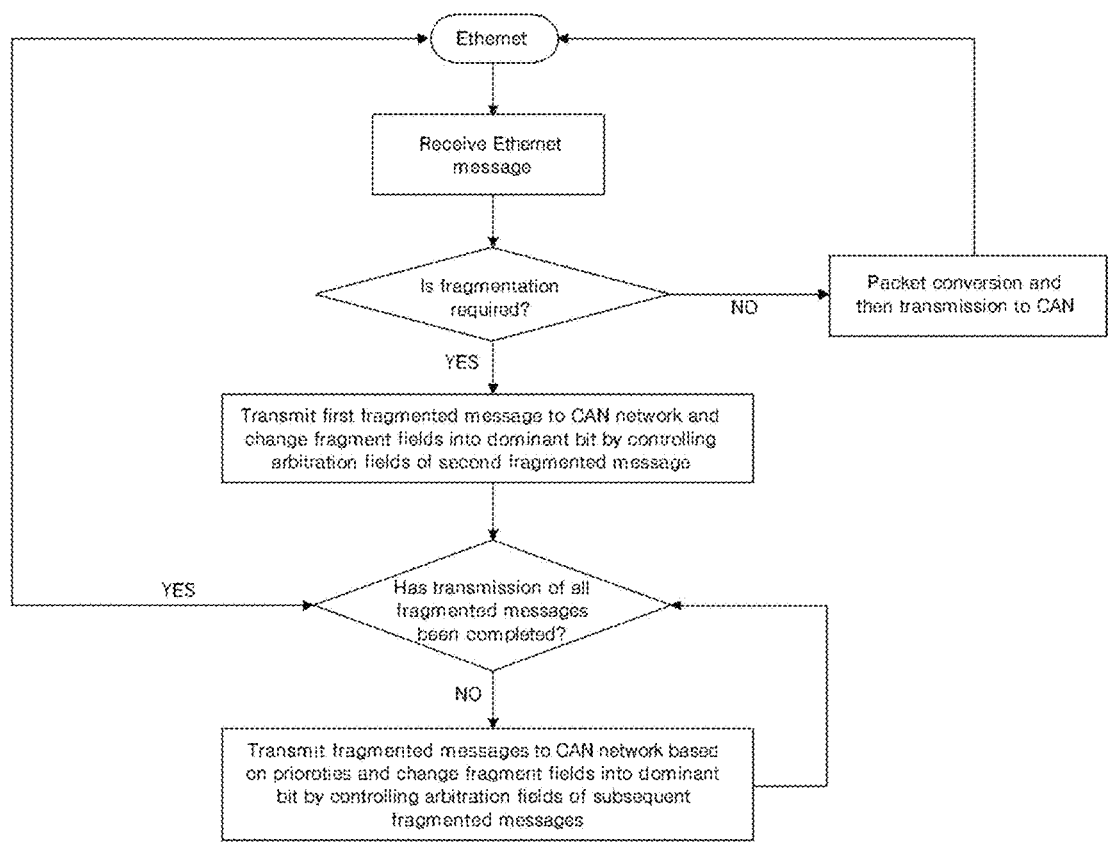
FIG. 7 is a state transition diagram illustrating a process of transmitting the fragmented messages of FIGS. 6a-6c.

FIG. 7 is a state transition diagram illustrating a process of transmitting fragmented messages using the fragment fields of FIG. 6.

First, the reception message processing unit 200 receives an Ethernet message. If the Ethernet message has a larger size than a CAN message, the transmission message processing unit 200 performs message fragmentation. If the size of the Ethernet message is smaller than or equal to that of the CAN message, however, the transmission message processing unit 200 does not perform fragmentation. If message fragmentation is performed, the transmission message processing unit 200 transmits the first fragmented message to a CAN network. The message transmission continuity management unit 400 changes fragment fields into a dominant bit by controlling arbitration fields from the second fragmented messages. The transmission message processing unit 200 transmits the fragmented messages to the CAN network based on changed priorities. Accordingly, the plurality of fragmented messages can be continuously transmitted.

As described above, the method and apparatus for controlling a message over a heterogeneous network according to an embodiment of the present invention can simplify a buffer for storing fragmented packets and a reassembly function by continuously receiving the fragmented packets.

The method and apparatus for controlling a message over a heterogeneous network according to an embodiment of the present invention can reduce a total transmission latency time attributable to a packet caught in the middle while fragmented packets are transmitted by continuously receiving the fragmented packets.

The method and apparatus for controlling a message over a heterogeneous network according to an embodiment of the present invention can maintain a message transmission sequence according to a point of time at which a message is generated by continuously receiving fragmented packets.

While the invention has been shown and described with respect to the preferred embodiments, it will be understood by those skilled in the art that various changes and modifications may be made without departing from the spirit and scope of the invention as defined in the following claims.

What is claimed is:

1. A method for controlling a message over a heterogeneous network, comprising:
   receiving a first message from a first network;
   generating a plurality of second messages which are a plurality of fragmented messages, each header comprising an arbitration field by performing fragmentation on the first message; and
   increasing priority of at least one remaining fragmented message by controlling the arbitration field of the at least one remaining fragmented message if a transmission of a first fragmented message over a second network is successful.

2. The method of claim 1, wherein increasing the priority comprises:
   checking a message transmission state of the second network, and
   transmitting the first fragmented message.

3. The method of claim 1, wherein increasing the priority comprises determining transmission continuity of the plurality of fragmented messages based on importance of the first message.

4. The method of claim 3, wherein increasing the priority comprises gradually increasing the priority by controlling the arbitration field of each of first to n-th (the n is a natural number of 2 or higher) fragmented messages of the remaining fragmented messages if the importance of the first message is a specific reference or less.

5. The method of claim 4, wherein increasing the priority comprises increasing the priority to a predetermined reference or more by controlling the arbitration field of each of the remaining fragmented messages subsequent to an (n+1)-th fragmented message of the remaining fragmented messages if the n is smaller than a number of the plurality of fragmented messages.

6. The method of claim 3, wherein increasing the priority comprises maximizing the transmission continuity of the plurality of fragmented messages by controlling the arbitration fields of the remaining fragmented messages if the importance of the first message exceeds the specific reference.

7. The method of claim 1, wherein increasing the priority comprises determining how much is the priority to be increased from a continued fragmented message if another message is caught in a middle while the plurality of fragmented messages is transmitted.

8. A message control apparatus over a heterogeneous network, comprising:
- a reception message processor configured to receive a first message from a first network;
- a transmission network sensor configured to check a message transmission state of a second network;
- a transmission message processor configured to generate a plurality of fragmented messages by performing fragmentation on the first message and to transmit the plurality of fragmented messages to the second network;
- a message transmission continuity manager configured to determine message transmission continuity of the plurality of fragmented messages by controlling priority of each of the plurality of fragmented messages based on importance of the first message; and
- a controller configured to control the reception message processor, the transmission network sensor, the transmission message processor, and the message transmission continuity manager.

* * * * *